US007136811B2

(12) United States Patent
Tirpak et al.

(10) Patent No.: US 7,136,811 B2
(45) Date of Patent: Nov. 14, 2006

(54) LOW BANDWIDTH SPEECH COMMUNICATION USING DEFAULT AND PERSONAL PHONEME TABLES

(75) Inventors: Thomas Michael Tirpak, Glenview, IL (US); Weimin Xiao, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 679 days.

(21) Appl. No.: 10/128,929

(22) Filed: Apr. 24, 2002

(65) Prior Publication Data

US 2003/0204401 A1 Oct. 30, 2003

(51) Int. Cl.

*G10L 19/00* (2006.01)
*G10L 21/06* (2006.01)
*G10L 15/06* (2006.01)
*G10L 13/06* (2006.01)

(52) U.S. Cl. ...................... 704/221; 704/244; 704/254; 704/235; 704/260

(58) Field of Classification Search ................ 704/221, 704/223

See application file for complete search history.

(56) References Cited

U.S. PATENT DOCUMENTS

| | | | | |
|---|---|---|---|---|
| 4,799,261 | A | 1/1989 | Lin et al. | 381/36 |
| 5,268,991 | A * | 12/1993 | Tasaki | 704/220 |
| 5,680,512 | A * | 10/1997 | Rabowsky et al. | 704/504 |
| 5,828,993 | A | 10/1998 | Kawauchi | 704/202 |
| 5,832,425 | A * | 11/1998 | Mead | 704/221 |
| 5,915,237 | A * | 6/1999 | Boss et al. | 704/270.1 |
| 5,933,805 | A * | 8/1999 | Boss et al. | 704/249 |
| 6,073,094 | A * | 6/2000 | Chang et al. | 704/223 |
| 6,088,484 | A * | 7/2000 | Mead | 382/232 |
| 6,119,086 | A * | 9/2000 | Ittycheriah et al. | 704/267 |
| 6,161,091 | A * | 12/2000 | Akamine et al. | 704/258 |
| 6,173,250 | B1 * | 1/2001 | Jong | 704/3 |
| 6,304,845 | B1 * | 10/2001 | Hunlich et al. | 704/259 |
| 6,721,701 | B1 * | 4/2004 | Goss et al. | 704/231 |
| 6,789,066 | B1 * | 9/2004 | Junkins et al. | 704/500 |

OTHER PUBLICATIONS

Hiroi, J. Tokuda, K. Masuko, T. Kobayashi, T. Kitamura, T. "Very Low Bit Rate Speech Coding Based on HMM's", Systems and Computers in Japan, vol. 32, No. 12, 1999.*

106th Audio Engineering Society (AES) Convention, Munich, Germany, May 10, 1999 Quackenbush, "What is MPEG-4 Audio and What Can I Do With It?."

106th AES Convention, Munich, Germany, May 10, 1999, Quackenbush, "MPEG-4 Speech Coding."

106th AES Convention, Munich, Germany, May 10, 1999, Herre, "MPEG-4 General Audio Coding."

106th AES Convention, Munich, Germany, May 10, 1999, Grill, "MPEG-4 Scalable Audio Coding."

106th AES Convention, Munich, Germany, May 10, 1999, Scheirer, "MPEG-4 Structured Audio."

AES 17th International Conference on Audio Coding, Presentation, Signa, Italy, Sep. 4, 1999, Brandenburg, "MP3 and AAC Explained."

(Continued)

*Primary Examiner*—David Hudspeth
*Assistant Examiner*—Matthew J. Sked

(57) ABSTRACT

A voice coding and decoding system 300 and method uses a personal phoneme table (320, 344) associated with a voice signature identifier (348) to permit encoding of true sounding voice by personalizing the phoneme table used for encoding and decoding. A default phoneme table (364) is used for encoding and decoding until a personal phoneme table (320, 344) is constructed. A MIDI decoder (360) is used to create the reconstructed speech from a string of phoneme identifiers transmitted from the sending side (302) to the receiving side (304).

23 Claims, 3 Drawing Sheets

OTHER PUBLICATIONS

AES 17th International Conference on Audio Coding, Presentation, Signa, Italy, Sep. 4, 1999, Nishiguchi, "MPEG-4 Speech Coding."

North Texas Computing Center Newsletter "Benchmarks," Oct. 1989, Lipscomb, "How Much for Just the Midi?".

* cited by examiner

LOW BANDWIDTH SPEECH COMMUNICATION USING DEFAULT AND PERSONAL PHONEME TABLES

FIELD OF THE INVENTION

This invention relates generally to the field of speech encoding and decoding. More particularly, this invention relates to a low bandwidth phoneme based speech encoding and decoding system and methods therefor.

BACKGROUND OF THE INVENTION

Low-bandwidth speech communication techniques, i.e., those that require only a small number of bits of information to represent a sample of audio data, are used in a variety of applications, such as mobile telephony, voice over Internet Protocol (VoIP), recording, audio data storage, and multimedia. In such applications, it is desirable to minimize the required bandwidth while maintaining acceptable quality in the reconstructed (de-coded) sound.

Phoneme based speech communication techniques have been used to accomplish low data rate speech communication. Such techniques satisfy the need to communicate via low bandwidth speech coding, but do not generally produce speech output that can be recognized as the voice of a particular speaker. Accordingly, the output speech from such systems has typically been machine-like, conveying little information about a speaker's emphasis, inflection, accent, etc. that the original speaker might use to convey more information than can be carried in the words themselves.

HVXC (Harmonic Vector eXcitation Coding) and CELP (Code Excited Linear Prediction) are defined as part of the (Moving Picture Experts Group) MPEG-4 audio standard and enable bit rates on the order of 1,500 to 12,000 per second, depending on the quality of the voice recording. As with vocoder (Voice codec) based methods such as defined in the G.722 standard, the HVXC and CELP methods utilize a set of tabulated and indexed human voice samples and identifies an index number of the sample that best matches the current audio waveform. The HVXC and CELP methods, however, separate the spectral portion of the sample from the stochastic portion, which varies with the speaker and the environment. Although they achieve higher compression rates than traditional vocoding, the HVXC and CELP methods requires 5 to 60 times higher bit rates than phoneme-based methods for voice transmission.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
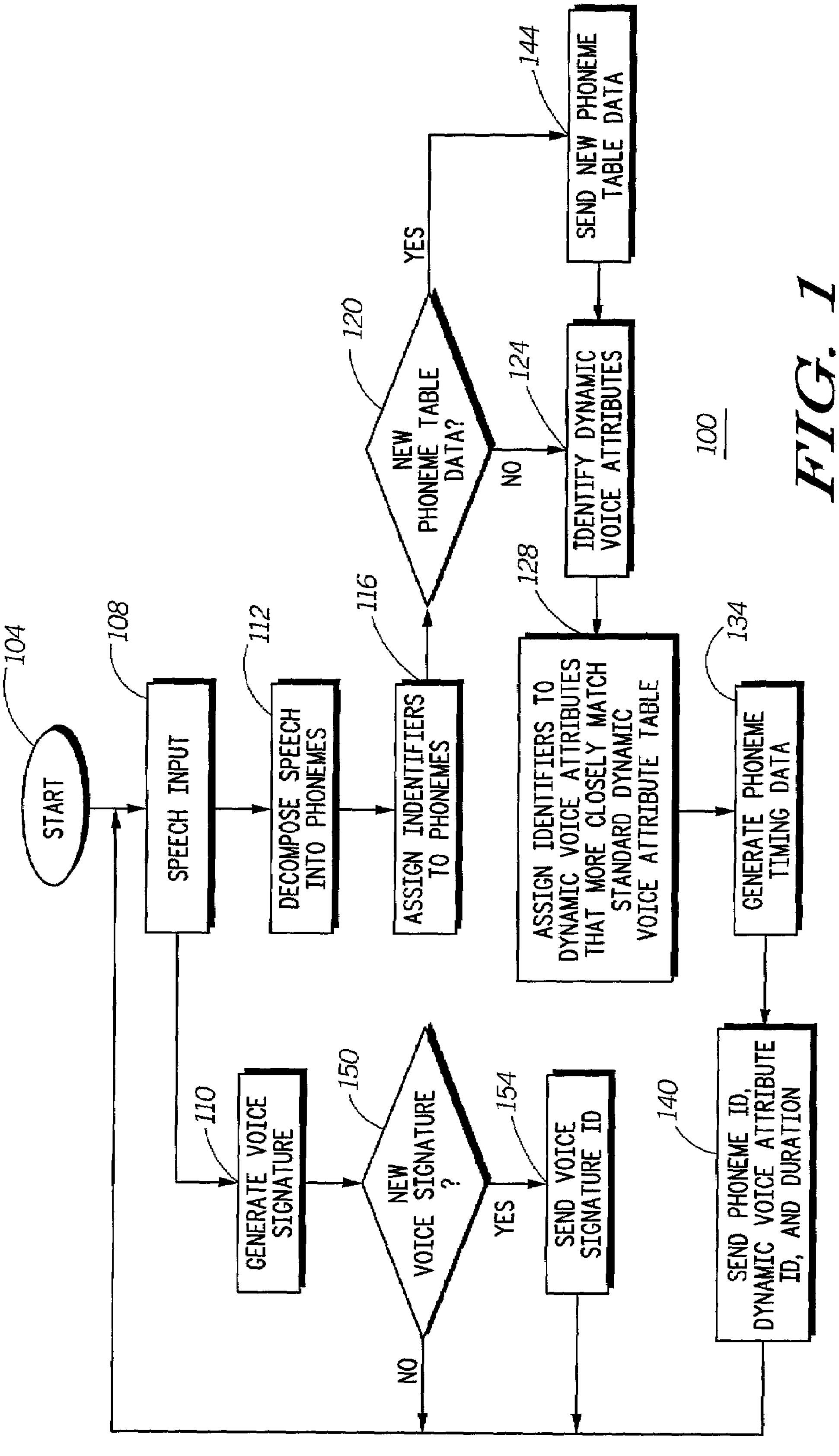
FIG. 1 is a flow chart depicting a voice encoding process consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

It should be noted that for different applications, the quality of voice sound transmission is judged in different ways. The opportunity exists to separate the information content into layers and thereby minimize the required amount of data that is transmitted and/or stored, depending upon how the voice sound quality will be judged. At a first layer, voice transmission can be judged by whether or not the sender's spoken word is faithfully decoded at the receiver side as the exact sound of the word. For example, the word "dog" should be received as "dog" not "bog". Homophones, such as "there" and "their" have identical phonetic representations. At a second layer voice quality can be judged by whether or not enough voice attribute data be included in the representation, so that the receiver can understand the information contained in the inflection and rhythm of the speaker's voice. At a third layer is whether or not the system faithfully conveys information about the speaker's accent, voice quality, age, gender, etc., that help the receiver understand the connotative meaning of the spoken words. At a fourth layer is whether or not enough information is transmitted to allow the receiver to recognize the identity of the speaker. Finally, there are general audio transmission quality attributes, such as, for example, smooth and continuous reconstruction of speech, minimal delay or gaps in transmission, etc.

The present invention provides enhanced speech reproduction using a phoneme-based system that can utilize a speaker's particular voice characteristics to build a customized phoneme table used in reproduction of the speech signal so that a more accurate representation of the original speaker's voice is created with minimal bandwidth penalty. This is accomplished by transmitting phoneme identifiers and voice attributes that are used in conjunction with a personalized phoneme table to a receiver for use in the decoding process. Thus, certain embodiments of the current invention permit the coding and decoding system, in real time, to utilize multiple phoneme tables for multiple speakers and/or multiple languages.

Certain embodiments of this invention provide a system architecture and method that achieves very high data compression rates, while maintaining high voice quality and the flexibility to provide several new features within a speech communication system such as a radio system.

Referring now to FIG. 1, one embodiment of the encoding process (used on the transmitter side of an encoder/decoder system) is illustrated as process 100 starting at 104. Speech signals are received as an input at 108 and the speech is subsequently decomposed into phonemes at 112 using speech recognition (signal processing) techniques. This dissects the continuous speech waveforms into phonemes so that, for example, the word "hat" might be represented as "hu"+"aa"+"t". At 116, a unique identifier, for example an eight bit identifier, is assigned to each phoneme, based on its match with a selected phoneme table. Assuming that the phoneme is not new at 120 (as will be explained later), the control passes to 124 where the output from the voice recognition system's output or the inverse transform of the frequency spectrum of the spoken voice is used to identify the "envelope" containing the dynamic voice attributes of rise/fall, loudness, etc. (i.e., [Attributes]=[Phoneme]$^{-1}$ [Original Sound]). At 128, an ID number (e.g., a 16 bit ID number) is assigned to the dynamic voice attributes, based on a quantization (e.g., 8 bits) of the maximum amplitude of the "envelope" and the ID number of the "envelope shape" that most closely matches those in a standard dynamic voice attribute look-up table. At 134 the speed of speech is represented in terms of the number of milliseconds (e.g., using 8 bits of data) of duration of the phoneme. At 140, the phoneme ID, dynamic voice attributes ID and duration are transmitted to the receiver.

The data transmitted at 140 above are similar to that of other known phoneme-based coding systems. However, in accordance with certain embodiments of the present invention, the incoming speech information is analyzed for use in creating a new set of phonemes that can be tabulated and used to represent the speech patterns of the speaker. In this manner, each individual speaker is associated with an individualized (personalized) phoneme table that is used to recreate his or her original speech. Thus, at 120, whenever the coding system recognizes a new speech phoneme in the input speech signal, it is added to a "personal phoneme table" and transmitted at 144 (either individually or as an entire table) to the receiver side for use in decoding. Thus, the decoder side of the system maintains a personal phoneme table received from the coder and uses the phoneme data stored in this personal phoneme table to reconstruct the voice from the transmitting side. In one embodiment, it is contemplated that the personal phoneme table will be constructed as the speech input is received. Thus, a transform period will exist during which time the decoded speech will gradually begin to sound more and more like the speech patterns of the actual speaker as phonemes are looked up first in the personal phoneme table and, if not present, are looked up in a default phoneme table. Once all phonemes are created that are needed to recreate the speaker's speech patterns, the default phoneme table is no longer used. (This can be implemented by initializing the personal phoneme table to the values in the default phoneme table and then supplying updates as new phonemes are identified.) Dynamic voice attributes from the input speech are matched up with those attributes in the default dynamic voice attributes table and applied to the new personal phoneme table along with the phoneme timing data.

As a by-product of the coding algorithm a relatively unique voice signature ID can be generated based on a Fourier analysis of a person's entire speech pattern at 110. The voice signature can be created based on a Fourier analysis of a person's entire speech pattern. When a new voice signature has been generated at 110 and detected at 150, this voice signature ID can be transmitted at 154 from the coder to the decoder in order to recall a stored personal phoneme table from prior use as the personal phoneme table for a current speech transmission. The process of generating voice signatures is an ongoing process that is carried out in parallel with the other processes depicted in process 100.

In the present exemplary embodiment, there are four types of transmissions from a sender side to a receiver side:

(1) Send phoneme: Phoneme ID (from a look up table created a priori), Dynamic voice attribute ID, and Duration;

(2) Send voice signature ID: Voice signature ID;

(3) Send phoneme table: Phoneme ID, Time step (portion of the phoneme sample), Sample; and (4) Send control parameter: Other system control data. The set of control parameters can be defined as the system is implemented. The original set of four transmission types can be expanded up to 128 types, if necessary, using an 8 bit command ID (1 control bit+7 control ID bits).

Thus, a speech coding method consistent with certain embodiments of the invention decomposes speech signals into a plurality of phonemes; assigns a phoneme identifier to each of the plurality of phonemes; generates phoneme timing data for each phoneme to indicate the duration of the phoneme; identifies dynamic voice attributes associated with the phonemes. The process further generates a voice signature identifier from the voice signal; sends an output coded representation of the speech to a decoder, the coded representation being suitable for decoding by a decoder. The sending can include transmitting the voice signature identifier; transmitting a representation of the plurality of phonemes and their associated identifiers to the decoder for use as a personal phoneme table; sending a string of phonemes identifiers to the decoder for decoding by looking up the phoneme in the personal phoneme table; transmitting the phoneme timing data for each phoneme; and transmitting a plurality of dynamic voice attribute identifiers associated with the phonemes.

Other encoding methods consistent with certain embodiments of the present invention include decomposing speech signals into a plurality of phonemes; assigning a phoneme identifier to each of the plurality of phonemes; sending an output coded representation of the speech to a decoder, the coded representation suitable for decoding by a decoder by transmitting a representation of the plurality of phonemes and their associated identifiers to the decoder for use as a personal phoneme table; and sending a string of phonemes identifiers to the decoder for decoding by looking up the phoneme in the personal phoneme table.

Figure 2:
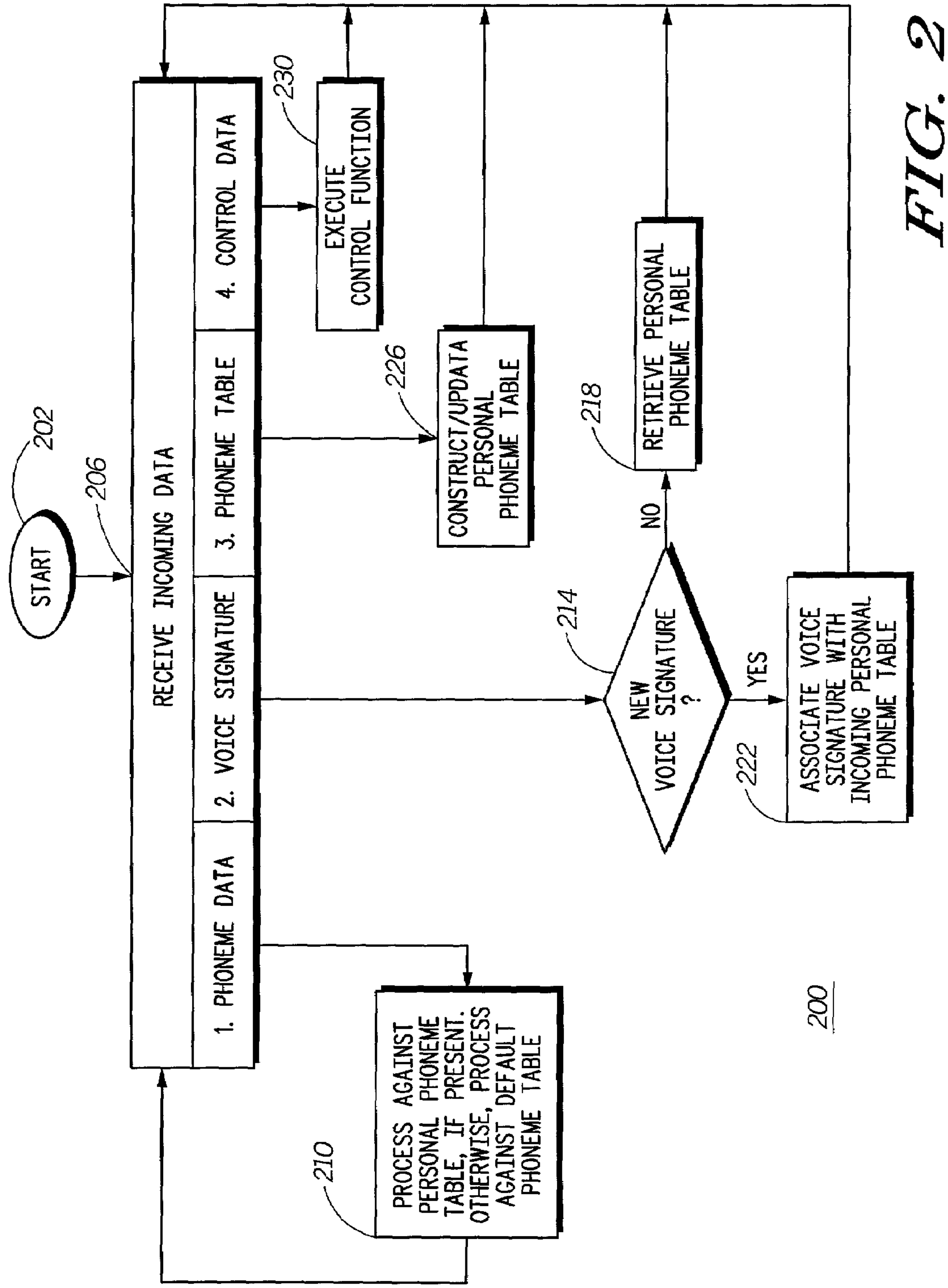
FIG. 2 is a flow chart depicting a decoding process consistent with certain embodiments of the present invention.

Referring now to FIG. 2, a decoding process 200 consistent with certain embodiments of the present invention starts at 202. As incoming data are received at 206, the data are identified as one of the four types of transmissions described above. In the event a segment of data is phoneme identifier data, the data segment is processed against either a default phoneme table or a personal phoneme table at 210 to extract an appropriate phoneme for the decoding process. During a time when the personal phoneme table is being constructed, phonemes may be selected from only the default phoneme table or from a mixture of the default and personal phoneme tables, with priority given to the personal phoneme table. This can be readily implemented by setting the initial values of the personal phoneme table to the values of the default phoneme table, then updating the personal phoneme table as new phonemes are identified in the incoming speech and made to be a part of the personal phoneme table.

In the event an incoming data segment contains a voice signature ID, the decoder determines if a personal phoneme table is stored in memory that contains the personal phoneme table associated with the voice signature ID at 214. If so, that personal phoneme table is retrieved from memory at 218 and used to process subsequently received phoneme data. If not, the voice signature is associated with a personal phoneme table that is in the process of being constructed, or which will be constructed during this session at 222.

In the event the incoming data segment contains personal phoneme table data at 206, the decoder begins construction of the personal phoneme table or updates the personal phoneme table at 226 with the data received.

In the event the incoming data segment contains control information, a control function dictated by the control data is executed at 230.

To summarize, certain of the transmitted data are processed in this exemplary embodiment by the receiver in one of the following ways: (1) Reconstruct a complete Phoneme table on the receiver side, based on type #3 transmissions, and associate it with a unique Voice Signature, i.e., a type #2 transmission; (2) Receive phonemes, i.e., type #1 transmissions, and reconstruct in real-time the true voice sound using the voice signature ID and a complete phoneme table available a priori on the receiver side. This process uses the selected phoneme table to identify the phoneme and the dynamic voice attribute table to identify the attributes. These two waveforms are convolved, transformed to the time domain, and played back according to the Duration code; (3) Receive phonemes and phoneme table data, i.e., type #3 transmission, simultaneously. Begin reconstructing in real-time a voice sound using a default voice signature ID and phoneme table available a priori on the receiver side. As more phoneme table information is received, the quality of the voice will become more and more like the true voice being transmitted by the sender; (4) Receive phonemes, i.e., type #1 transmission, and reconstruct in real-time a voice sound using a default phoneme table available a priori on the receiver side; (5) Receive voice signature ID, and register the "speaker ID" in addition to the "caller ID" on the receiver side; or (6) Receive a control parameter and adjust the performance or operation of the system accordingly.

Like the Musical Instrument Digital Interface (MIDI) standard with Wavetable sound, a minimum amount of data is transmitted between the sender and the receiver. The true voice characteristics are stored on the receiver side and accessed as a look-up from the personal Phoneme table indexed by a phoneme identifier. In parallel with the transmission of phoneme IDs, it is possible to transmit samples in the phoneme table for a given voice, thereby increasing the fidelity of the voice sound. Because of the ability to transmit personalized phoneme table data, it is possible to accommodate multiple users as well as individual users speaking multiple languages. The invention can be used to represent voice data in a way that is similar or compatible to existing MIDI and Motion Picture Experts Group (MPEG) standards (e.g., MPEG-4).

As a byproduct of the coding algorithm, it is possible to establish a relatively unique voice signature, which can be used at the receiver side to select the true voice sample table and/or identify the sender. This feature has applications for the MPEG content identification standard, e.g., as in MPEG-7, and extends the "Caller ID" feature that is common on telephones today to include a "Speaker ID".

Thus, a decoding method consistent with certain embodiments of the present invention includes receiving a voice identifier; receiving a string of phoneme identifiers; receiving phoneme timing data specifying a time duration for each phoneme; receiving a plurality of dynamic voice attribute identifiers with one associated with each phoneme; decoding the string of phoneme identifiers using MIDI processor to process the phonemes using a selected phoneme table. The selected phoneme table is selected from at least one of a default phoneme table, a personalized phoneme table identified by the voice identifier and retrieved from memory, and a phoneme table constructed upon receipt of personalized phoneme data and associated with the voice identifier. If a phoneme is missing from the personalized phoneme table, a phoneme is selected from the default phoneme table. The decoding may include reconstructing the phoneme using the timing data to determine the time duration for the phoneme and using the dynamic voice attribute associated with the phoneme to specify voice attributes for the phoneme.

Other decoding methods consistent with certain embodiments of the present invention receive a string of phoneme identifiers; and decode the string of phoneme identifiers using a selected phoneme table, wherein the selected phoneme table is selected from one of a default phoneme table and a personalized phoneme table.

Figure 3:
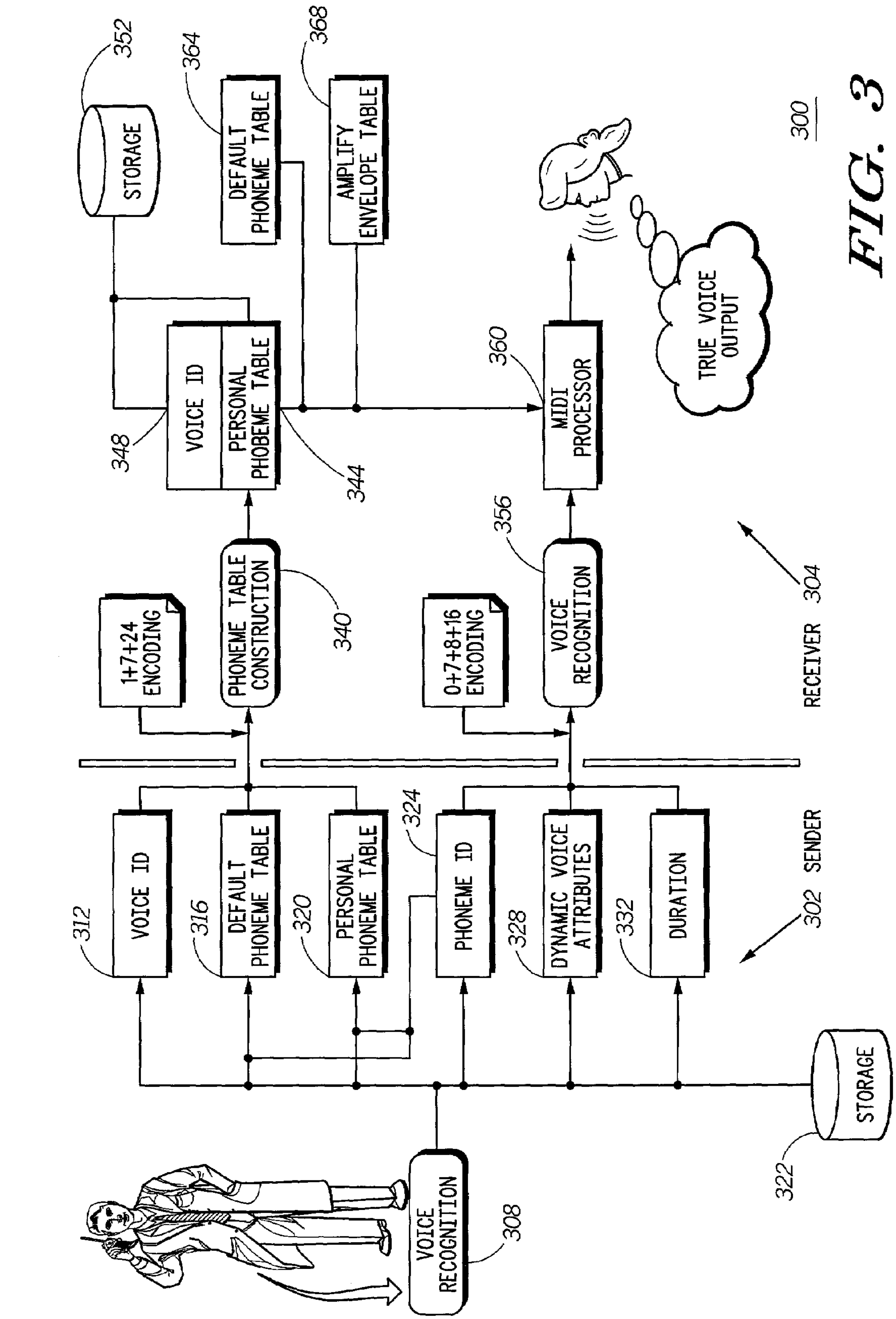
FIG. 3 is a functional block diagram illustrating operation of an encoder and decoder system consistent with certain embodiments of the present invention.

Referring now to FIG. 3, a coding and decoding system consistent with certain embodiments of the present invention is illustrated as system 300. The coding is implemented in the sender side 302 while the decoding is implemented in the receiver side 304. The sender side 302 and receiver side 304 may be a part of any suitable speech communication system. A speech input signal is passed from a speaker to a voice recognition block 308. The output of the voice recognition block 308 is provided to subsystems that may be hardware or software based, that generate the voice signature at 312. The speech is initially processed against a default phoneme table 316 as a personal phoneme table 320 is constructed as described above. The personal phoneme table 320 can be stored for later use, e.g., using storage device 322, along with an identifying voice signature. Phoneme identifiers are extracted by comparison with the two phoneme tables at 324 and are transmitted to the receiver side. Dynamic voice attributes are also extracted from the speech at 328 and the duration of each phoneme is timed at 332. As described previously, the dynamic voice attributes and duration information is also transmitted to the receiver side 304. Once the voice signature ID is generated it is also sent to the receiver side. The personal phoneme data from the personal phoneme table 320 can be transmitted to the receiver side 304 as it is generated, or as a complete table.

At the receiving side, the personal phoneme table is constructed at 340 and stored along with the voice signature ID at 344 and 348. This information can be stored in persistent storage such as a disc drive 352 for later retrieval during another speech communication session if desired. As the phoneme identifiers are received along with the duration information and dynamic voice attributes, they are reconstructed at 356 and used to drive a standard MIDI processor 360. The MIDI processor addresses either the default phoneme table 364 or the personal phoneme table 344 (or both) to obtain the phonemes for use in the reproduction of the original speech. The MIDI processor 360 utilizes the dynamic voice attributes in conjunction with the amplify envelope table 368 to reproduce the voice output.

This architecture can be considered in terms of two main functions: voice transmission and personal phoneme table transmission. The voice transmission begins with voice recognition 308. Voice transmission utilizes three of the outputs from voice recognition 308, i.e., the phoneme ID, the dynamic voice attributes, and the duration of the phoneme as spoken. These three outputs are subsequently encoded in a "0+7+8+16" bit-stream as follows.

Bit 1: Set to 0, designating that this is a Voice Transmission (rather than another command, e.g., voice table element)

Bits 2–8: The duration of the phoneme as spoken, e.g., 24 ms.

Bits 9–16: The Phoneme ID as output by the voice recognition method of 308. If a Personal Phoneme table 344 is available, then the Phoneme ID references an element in that table. However, if a personal phoneme table 344 is not available, then the Phoneme ID references an element in the default phoneme table 364.

Bits 17–32: The dynamic voice attributes, which are a by-product of the signal processing performed by the voice recognition method.

On the receiver side, the voice reconstruction module 356 collects the transmitted "0+7+8+16" bit-streams, and compiles them into the industry-standard Musical Instrument Digital Interface (MIDI) format. The Phoneme ID corresponds to a MIDI note. The time duration is translated to the standard MIDI time interval. The dynamic voice attributes are translated into MIDI control commands, e.g., pitch bending and note velocity.

The final stage in voice transmission in this illustrative embodiment is performed by the MIDI processor 360, which combines the MIDI stream created by the voice reconstruction module with the available phoneme table (344 or 364), and subsequently reconstructs the voice sound. The amplify envelope table 368 contains a parametric representation of voice characteristics that are independent of the specific phoneme being spoken and the speaker. It implements MIDI control commands specific for interpreting the dynamic voice attributes. This is in contrast to standard MIDI control commands, e.g., note velocity.

The personal phoneme table transmission function uses the results from the voice recognition module 308 over a period of time to construct a personal phoneme table 320, if one does not already exist for the speaker with a given Voice ID. The Voice ID is one of the by-products of the signal processing performed by the voice recognition method. The default phoneme table is specified for encoding and decoding when the system is initially constructed. Thus, it may be implemented in Read-Only Memory (ROM) and copied to Random-Access Memory (RAM) as needed. The system, however, may contain personal phoneme tables for encoding and decoding for multiple users, and store these in persistent memory, such as flash RAM or disc drive storage.

For a new user, the personal phoneme table will be initialized to the default phoneme table. Based on the success in transmission with the personal phoneme table, elements originally taken from the default phoneme table may be replaced with phoneme table elements derived specifically for a given speaker. The success in transmission may be determined at the encoding side, e.g., how well do the available phonemes in the personal phoneme table match the real voice phonemes that are identified by the voice recognition module. The success in transmission may also be determined at the decoding side, e.g., how well do the elements in the personal phoneme table (which was transmitted to the receiver) match the elements in the receiver's default phoneme table. Other metrics for successful voice decoding may include generic sound quality attributes, e.g., continuity in the voice signal. The success in transmission as determined at the decoding side can be transmitted back to the encoding side, using a "1+7+24" control command bit-stream, so as to provide closed-loop feedback.

Bit 1: Set to 1, designating that this is a control command bit-stream, e.g., voice table element.

Bits 2–8: The ID for the specific command that is being transmitted.

Bits 9–32: The contents of the specific command that is being transmitted, e.g., a section of a waveform associated with a specific voice table element.

The phoneme table construction module collects "1+7+24" control command bit-streams and constructs personal phoneme tables. For each unique speaker, as designated by a unique voice ID, a unique personal phoneme table is constructed, if one does not already exist at the receiving end of the system. While the personal phoneme table is being initially constructed or incrementally updated, the default phoneme table can be used.

The Musical Instrument Digital Interface (MIDI) standard can achieve CD-quality audio using bit rates of only about 1,000 per second and sampled Wavetable instruments stored on the playback device. The MIDI standard defines 128 "notes" for each sound "patch". Notes are turned on and off using 30 bit instructions, including the command ID byte, the data byte (with the note number), and the velocity (loudness) byte. Thus, assuming 7 phonemes per second of speech and a sound patch containing the 40–50 basic phonemes in English, voice data could be transmitted at 420 bits per second. The quality, however, would be that of a flat "robot" voice. To increase the total number of phonemes that can be played as Wavetable samples, the MIDI Program Change command can be used to switch between the 128 available sound patches in a playback device's "bank". With this arrangement, the maximum number of phoneme variations would be 16,384, and the effective transmission rate would be 630 bits per second. With the larger number of phonemes, it is likely that a realistic voice can be produced. This would be effective for text-to-speech applications. If efficient coding is implemented, e.g., via a neural network, and an exhaustive set of phonemes are included in the Wavetable bank, it may be possible to construct a pure MIDI representation of speech data. The MPEG standard, e.g., MPEG-4, defines MIDI-like capabilities for synthesized sound (test-to-speech) and score driven synthesis (Structured Audio Orchestra Language), but not for natural audio coding.

A coding and decoding system constructed according to certain embodiment of this invention permit transmission of true sounding voice using a minimal amount of transmitted data and can be adapted to flexible time sampling and flexible voice samples, as opposed to fixed sampling intervals and samples used by vocoders. Voice recognition enables the system to achieve a very high compression ratio, as a result of both the variable time sampling and the transmission of phonemes, i.e., transmission type #1 as above. As a byproduct of the coding algorithm, it is possible to establish a relatively unique voice signature, which can be used at the receiver side to select the true voice sample table and/or identify the sender. If the sender chooses to not send the voice signature ID, a high quality yet anonymous voice can be heard by the receiver. Undesirable attributes of the voice transmission, e.g., environmental noise, can be easily filtered out, since only the phoneme sets are required to reconstruct the voice at the receiver side. Dynamic voice attributes can be transmitted, but attributes corresponding to noise need not be included in the look-up table and thereby can be suppressed. Transmission of information as phoneme IDs increases the efficiency of applications running in a voice over Internet Protocol (IP) environment, since the information can be directly used by language analysis tools and voice automated systems.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of dynamic speech coding and decoding, comprising:
- decomposing speech signals into a plurality of phonemes;
- matching the plurality of phonemes to identifiers in a default phoneme table;
- assigning a phoneme identifier to each of the plurality of phonemes, the phoneme identifier being an identifier for the closest match in the default phoneme table;
- constructing a personal phoneme table from the decomposed plurality of phonemes, identified by the plurality of phoneme identifiers;
- sending an output coded representation of the speech to a decoder, the coded representation suitable for decoding by a decoder by:
  - transmitting a representation of at least one of the plurality of phonemes and their associated identifiers to the decoder for use as a personal phoneme table;
  - sending a string of phoneme identifiers to the decoder for decoding by looking up the phoneme in the personal phoneme table;
  - wherein, the representation of the at least one of the plurality of phonemes and their associated identifiers are transmitted as a control message during time periods when the string of phoneme identifiers are not being sent;
- at the decoder, building a personal phoneme table by:
  - receiving the representation of the at least one of the plurality of phonemes and their associated identifiers as control signals when transmitted to the decoder;
  - entering the representation of the at least one of the plurality of phonemes and their associated identifiers into a personal phoneme table;
- at the decoder, generating a speech signal by:
  - receiving the string of phoneme identifiers and attempting to match each received phoneme identifier with an entry in the personal phoneme table;
  - if a phoneme identifier matches a phoneme in the personal phoneme table, retrieving the matching phoneme from the personal phoneme table;
  - if a phoneme identifier does not match a phoneme in the personal phoneme table, retrieving a matching phoneme from the default phoneme table; and
  - constructing an approximation of the speech signal from the phonemes retrieved from the personal phoneme table and the default phoneme table,
  - wherein at least one of transmitting the representation of at least one of the plurality of phonemes and their associated identifiers and building the personal phoneme table at the decoder occurs dynamically.

2. The method in accordance with claim 1, further comprising:
- generating phoneme timing data for each phoneme to indicate the duration of the phoneme; and
- transmitting the phoneme timing data for each phoneme.

3. The method in accordance with claim 2, wherein the timing data are represented by eight bits of digital information specifying the phoneme duration in milliseconds.

4. The method in accordance with claim 1, further comprising:
- identifying dynamic voice attributes associated with the phonemes; and
- transmitting a plurality of dynamic voice attribute identifiers associated with the phonemes.

5. The method in accordance with claim 4, wherein the dynamic voice attribute identifiers are encoded as a sixteen bit digital code.

6. The method in accordance with claim 1, further comprising:
- generating a voice signature identifier from the voice signal; and
- transmitting the voice signature identifier.

7. The method in accordance with claim 1, wherein the phoneme identifiers are encoded as an eight bit digital code.

8. A method of dynamic speech coding, comprising:
- providing a phoneme table containing a plurality of indexed default phonemes;
- decomposing speech signals into a plurality of decomposed phonemes; and
- generating a personal phoneme table comprising the decomposed phonemes indexed by an index of a closest matching default phoneme, wherein a new entry is made in the personal phoneme table each time a phoneme is indexed to a closest matching default phoneme which has not previously been entered into the personal phoneme table;
- transmitting a stream of phoneme identifiers from a sending side to a receiving side, wherein each phoneme identifier relates each phoneme to both its closest matching phoneme in the default phoneme table and the personal phoneme table; and
- transmitting entries in the personal phoneme table from the sending side to the receiving side as control signals via a transmission channel, when there is a period of inactivity on the transmission channel, wherein at least one of transmitting the stream of phoneme identifiers from the sending side to the receiving side and transmitting entries in the personal phoneme table from the sending side to the receiving side as control signals via the transmission channel occurs dynamically.

9. A method of dynamically speech coding, comprising:

decomposing speech signals into a plurality of phonemes;

assigning a phoneme identifier to each of the plurality of phonemes;

generating phoneme timing data for each phoneme to indicate the duration of the phoneme;

identifying dynamic voice attributes associated with the phonemes;

generating a voice signature identifier from the voice signal;

sending an output coded representation of the speech over a channel to a decoder, the coded representation suitable for decoding by a decoder by:

transmitting the voice signature identifier;

transmitting a representation of at least one of the plurality of phonemes and their associated identifiers to the decoder as a control signal during periods of inactivity on the channel for use in constructing a personal phoneme table;

sending a string of phonemes identifiers to the decoder for decoding by looking up the phoneme in the personal phoneme table if present, and if not present looking up the phoneme in a default phoneme table;

transmitting the phoneme timing data for each phoneme; and transmitting a plurality of dynamic voice attribute identifiers associated with the phonemes, wherein sending the output coded representation of the speech over to the channel to a decoder occurs dynamically.

10. A method of dynamically decoding speech, comprising:

receiving a string of phoneme identifiers; and decoding each phoneme identifier of the string of phoneme identifiers using a selected phoneme table, wherein the selected phoneme table is selected from one of a default phoneme table and a personalized phoneme table and wherein decoding is in accordance with a representation of the string of phoneme identifiers transmitted as a control message during time periods when the string of phoneme identifiers are not being sent and wherein decoding each phoneme identifier using the selected phoneme table occurs dynamically.

11. A method in accordance with claim 10, wherein the phoneme identifiers are encoded as an eight bit digital code.

12. The method according to claim 10, further comprising:

receiving a voice identifier; and retrieving a stored personalized phoneme table identified by the voice identifier as the selected phoneme table.

13. The method according to claim 10, further comprising:

receiving at least one entry in the personalized phoneme table; and wherein the received personalized phoneme table comprises the selected phoneme table.

14. The method according to claim 10, further comprising:

receiving a voice identifier; and associating the voice identifier with the personalized phoneme table.

15. The method according to claim 10, wherein the decoding comprises processing the string of phoneme identifiers using a MIDI processor.

16. The method according to claim 10, further comprising:

receiving phoneme timing data specifying a time duration for each phoneme; and reconstructing the phoneme using the timing data to determine the time duration for the phoneme.

17. The method in accordance with claim 16, wherein the timing data are represented by eight bits of digital information specifying the phoneme duration in milliseconds.

18. The method according to claim 10, further comprising:

receiving a plurality of dynamic voice attribute identifiers with one associated with each phoneme; and reconstructing each phoneme using the dynamic voice attribute associated therewith to specify voice attributes for the phoneme.

19. The method in accordance with claim 18, wherein the dynamic voice attribute identifiers are encoded as a sixteen bit digital code.

20. A method of dynamically decoding speech, comprising:

receiving a voice identifier;

receiving a string of phoneme identifiers;

receiving phoneme timing data specifying a time duration for each phoneme;

receiving a plurality of dynamic voice attribute identifiers with one associated with each phoneme;

decoding the string of phoneme identifiers using MIDI processor to process the phonemes using a selected phoneme table;

wherein the selected phoneme table is selected from at least one of a default phoneme table, a personalized phoneme table identified by the voice identifier and retrieved from memory, and a phoneme table constructed upon receipt of personalized phoneme data and associated with the voice identifier and in accordance with a control signal representative of the dynamic voice attribute identifiers and transmitted on a transmission channel when there is a period of inactivity on the transmission channel;

wherein if a phoneme is missing from the personalized phoneme table, a phoneme is selected from the default phoneme table; and wherein the decoding comprises reconstructing the phoneme using the timing data to determine the time duration for the phoneme and using the dynamic voice attribute associated with the phoneme to specify voice attributes for the phoneme, wherein at least one of the selected phoneme table being selected and the phoneme table being constructed upon receipt of personalized phoneme data occurs dynamically.

21. A method of dynamically constructing a personalized phoneme table for speech transmission using a phoneme based speech communication system, comprising:

initializing a personalized phoneme table with a set of default values;

decomposing a speech signal into a plurality of phonemes; and replacing certain of the default values with the plurality of phonemes in accordance with a control signal representative of the plurality of phonemes, said control signal transmitted on a transmission channel when there is a period of inactivity on the transmission channel, wherein at least replacing certain of the default values with the plurality of phonemes in accordance with the control signal occurs dynamically.

22. The method in accordance with claim 21, further comprising transmitting data from the personalized phoneme table from a sender side to a receiver side of the phoneme based speech communication system.

23. The method in accordance with claim 22, further comprising decoding a string of phoneme identifiers at the receiver side into speech using the personalized phoneme table.

* * * * *